(12) United States Patent
Ananian et al.

(10) Patent No.: US 8,386,288 B2
(45) Date of Patent: Feb. 26, 2013

(54) WORKFLOW MANAGEMENT SYSTEM AND METHOD WITH WORKFLOW PACKAGE EXCHANGE BETWEEN DROP-BOX APPLICATION PROGRAMS

(75) Inventors: John Allen Ananian, Winchester, CA (US); James D. Bryan, Ladera Ranch, CA (US)

(73) Assignee: Direct Response Medicine, LLC, Winchester, CA (US)

( * ) Notice: Subject to any disclaimer, the term of this patent is extended or adjusted under 35 U.S.C. 154(b) by 403 days.

(21) Appl. No.: 12/695,108

(22) Filed: Jan. 27, 2010

(65) Prior Publication Data

US 2010/0305997 A1 Dec. 2, 2010

Related U.S. Application Data

(60) Provisional application No. 61/147,713, filed on Jan. 27, 2009.

(51) Int. Cl.
*G06F 17/00* (2006.01)
(52) U.S. Cl. ..................... 705/7.13
(58) Field of Classification Search ............... 705/7.13
See application file for complete search history.

(56) References Cited

U.S. PATENT DOCUMENTS

| | | | |
|---|---|---|---|
| 5,960,404 | A | 9/1999 | Chaar et al. |
| 6,728,947 | B1 | 4/2004 | Bengston |
| 2008/0162155 | A1* | 7/2008 | Small et al. ............ 705/1 |

OTHER PUBLICATIONS

"Drop.io from Wikipedia," <http://en.wikipedia.org/wiki/Drop.io>, Drop.io website launched Nov. 6, 2007, Wikipedia page accessed Apr. 12, 2011, 4 pages.

"CrunchBase Drop.io," <http://www.crunchbase.com/company/drop.io>, Drop.io founded Nov. 2007, CrunchBase web page accessed Apr. 12, 2011, 5 pages.
"Comparison of file hosting services" http://en.wikipedia.org/wiki/Comparison_of_file_hosting_services, Updated Mar. 17, 2011, 3 pages.
"Share, Manage and Access All Your Business Content Online," www.box.net, 2010, 2 pages.
"Box.net," http://en.wikipedia.org/wiki/Box.net, Updated Feb. 26, 2011, 3 pages.
"Dropbox" Dropbox, www.dropbox.com, 2011, 1 page.
"Dropbox (service)," http://en.wikipedia.org/wiki/Dropbox_(service), Mar. 24, 2011, 7 pages.
"MagicVortex Full Transit Service," Sage Analytic, http://magicvortex.com, 2010, 1 page.
"MagicVortex," http://en.wikipedia.org/wiki/MagicVortex, Nov. 2001, 2 pages.
"Welcome to MediaFire," Mediafire, http://www.mediafire.com/, 2011, 1 page.

(Continued)

*Primary Examiner* — Thomas Dixon
(74) *Attorney, Agent, or Firm* — Alleman Hall McCoy Russell & Tuttle LLP

(57) ABSTRACT

A workflow management system for managing workflow within one or more entities is provided. The workflow management system may include a first drop-box application program executed on a first computing system including a first input object directory configured to receive an input object electronically outputted from an application program. The first drop-box application program may further include a first workflow engine configured to generate and send a workflow package to a second drop-box application program executed on a second computing system, the workflow package including the input object, a plurality of workflow tasks, and a set of predetermined workflow rules defined by a user via the first drop-box application program. In some examples at least one workflow task may be implemented via the second drop-box application program based on the set workflow rules.

19 Claims, 9 Drawing Sheets

OTHER PUBLICATIONS

"MediaFire," http://en.wikipedia.org/wiki/MediaFire, Updated Feb. 20, 2011, 3 pages.
"Keep it all in Sync," Microsoft, http://sync.live.com/, 2011, 1 page.
"PowerFolder," http://www.powerfolder.com/, Accessed Mar. 24, 2011, 1 page.
"FilePhile" Secure Unlimited File Transfers, http://www.filephile.net/index.php, Accessed Mar. 24, 2011.
"FilesDIRECT" FilesDIRECT, http://www.filesdirect.com/features.aspx, 2011, 3 pages.
"FileCatalyst Workflow" http://www.filecatalyst.com/products/filecatalyst-workflow, 5 pages.
"FileCatalyst Workflow: File Submission and Workflow" http://www.filecatalyst.com/products/filecatalyst-workflow/submission-and-workflow/, pp. 1-5, Accessed Mar. 24, 2011.
"FileCatalyst Workflow: Online Storage," http://www.filecatalyst.com/products/filecatalyst-workflow/online-file-storage/, Accessed Mar. 24, 2011, 4 pages.
"FileCatalyst Workflow: Features" http://www.filecatalyst.com/products/filecatalyst-workflow/features/, Accessed Mar. 24, 2011, 5 pages.
"FileCatalyst Workflow Editions" http://www.filecatalyst.com/products/filecatalyst-workflow/compare-editions/, Accessed Mar. 24, 2011, 5 pages.
"Egress" Egress Software Technologies Ltd., http://www.egress.com/, 2011, 2 pages.
"Watchdox" http://www.watchdox.com/, Accessed Mar. 24, 2011, 1 page.
"Sendthisfile" SendThisFile, Inc, http://sendthisfile.com/, 2011, 2 pages.
"Qnext" Qnext Corp., http://www.qnext.com/file_transfer.shtml, 2010, 1 page.
"YouSENDit" YouSendIt, http://www.yousendit.com/, 2011, 1 page.
"DropSend" DropSend Ltd., http://www.dropsend.com/, 2011, 2 pages.
"MongoFiles" http://www.mongofiles.com/, Accessed Mar. 24, 2011, 2 pages.
"Compliant Email, Large File Transfer, Document Control & Secure Fax," SafetySend, Inc., http://www.safetysend.com/, 2010, 2 pages.
"Microsoft SharePoint 2010" Microsoft Corporation., http://www.sharepoint.microsoft.com/en-us/pages/default.aspx, Updated 2010, pp. 1, Accessed Mar. 24, 2011.
"Windows Workflow Foundation . . . " Microsoft, http://msdn.microsoft.com/en-us/netframework/aa663328.aspx, 2011, 1 page.
"The Workflow Way: Understanding Windows Workflow Foundation" Chappell, David, http://msdn.microsoft.com/library/dd851337.aspx, Updated Apr. 2009, 21 pages.
Andrew, Paul, "What to use Windows Workflow Foundation for?," http://blogs.msdn.com/b/pandrew/archive/2007/02/01/what-to-use-windows-workflow-foundation-for.aspx, Updated Feb. 1, 2007, 4 pages.
"OmniDROP Compared to other Communication Methods" Direct response Medicine, LLC, 2010, 1 pages.

* cited by examiner

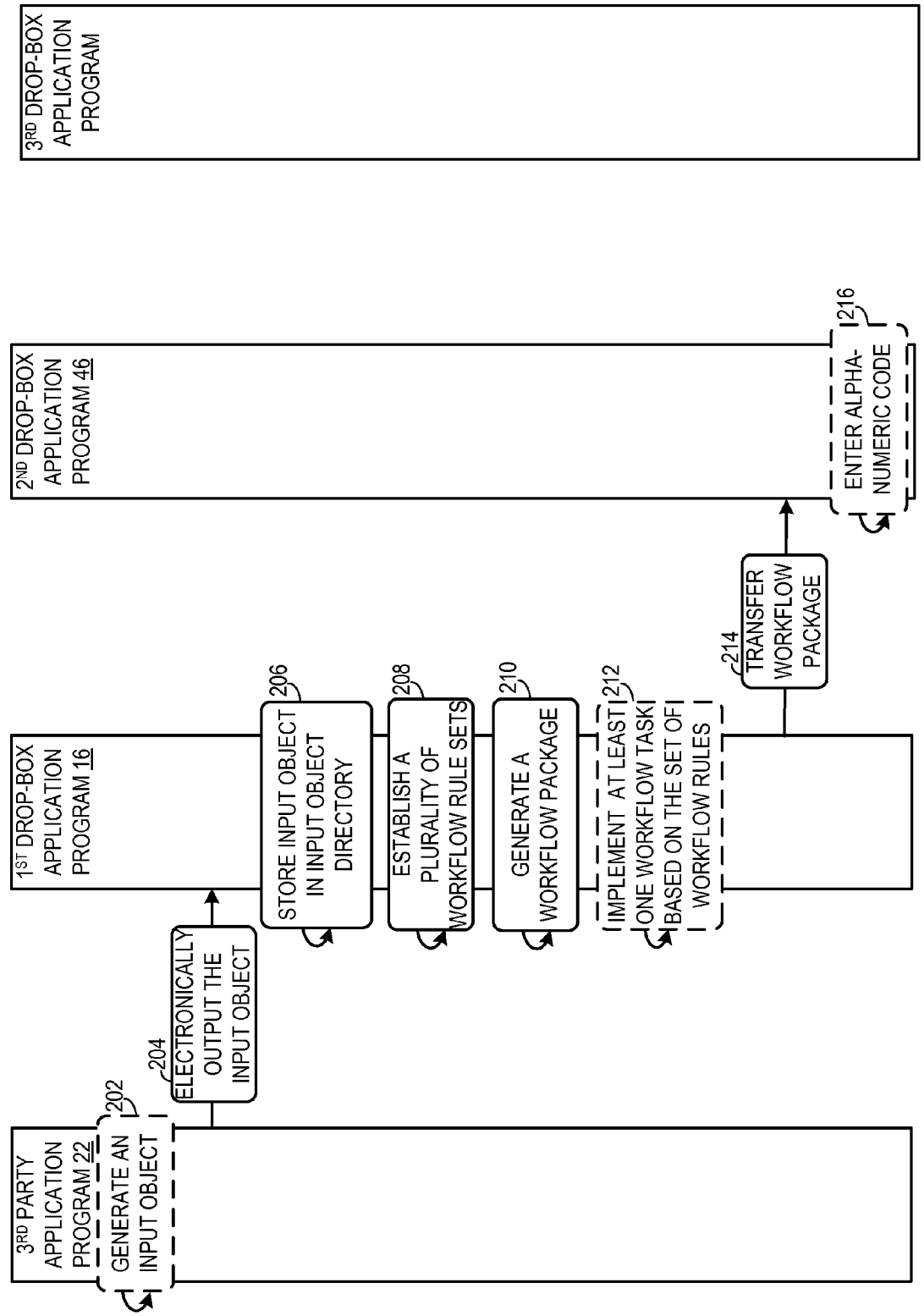

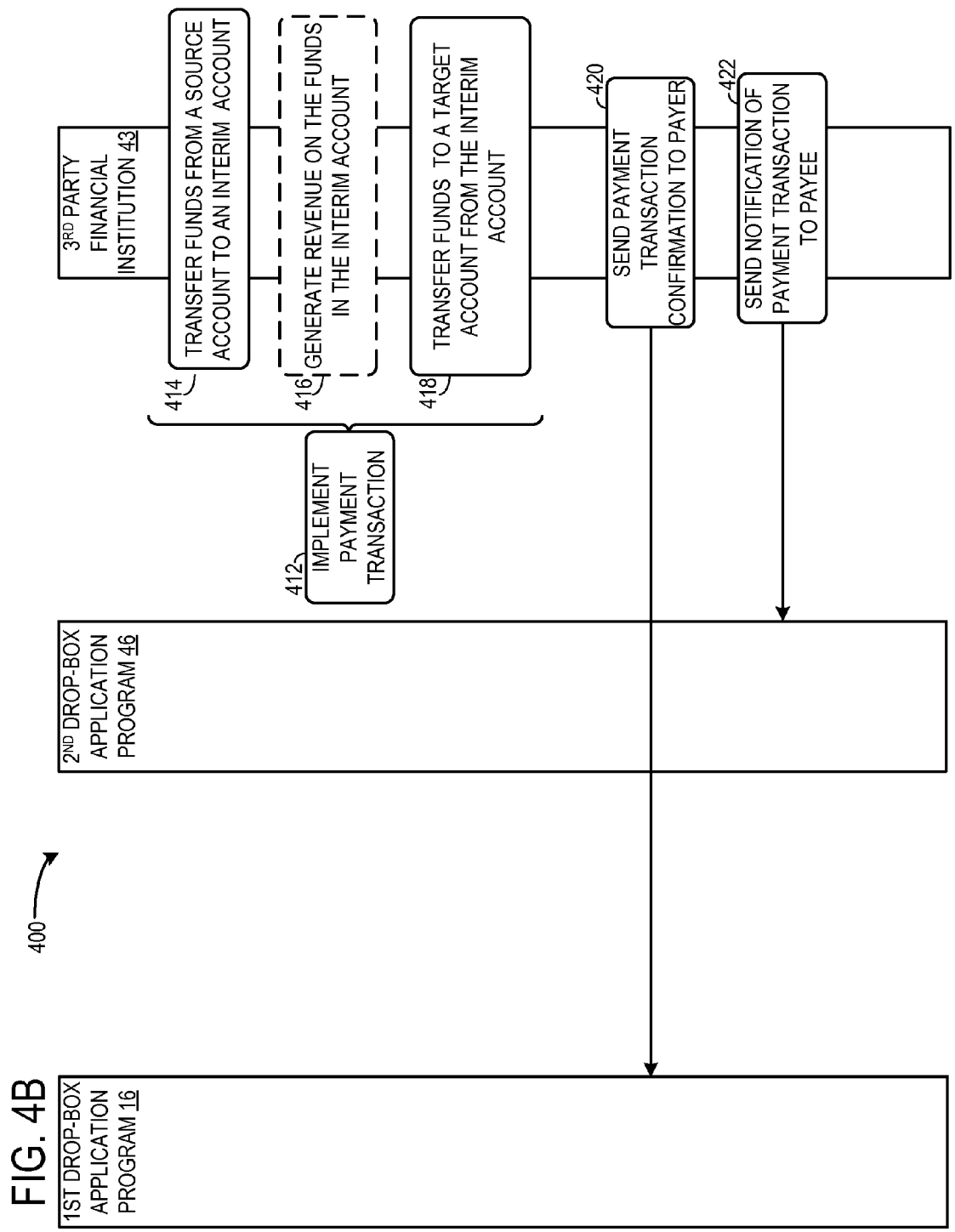

WORKFLOW MANAGEMENT SYSTEM AND METHOD WITH WORKFLOW PACKAGE EXCHANGE BETWEEN DROP-BOX APPLICATION PROGRAMS

CROSS REFERENCE TO RELATED APPLICATION

This application claims priority to U.S. Provisional Application No. 61/147,713, filed Jan. 27, 2009, and titled WORKFLOW SYSTEM. The entirety of the above listed application is incorporated herein by reference for all purposes.

BACKGROUND

Managing workflows in modern enterprises is a challenge. A workflow may involve several tasks conducted in parallel or in series by persons across one or more organizations. The order and content of the tasks may depend on the results of prior tasks. Particularly when the tasks in a workflow are conducted by multiple organizations, inefficiencies may arise. For example, the different organizations may use incompatible software programs, business rules, data formats, etc., and the communication tools that are used to transfer information between the organizations regarding the tasks in the workflow may be inadequate. As a result, insufficient or inaccurate information may be communicated at some stage in the workflow, requiring re-working of a task and delaying the workflow as a whole, and/or corrupting the later tasks in the workflow and ultimately lowering the quality of the end product of the workflow.

SUMMARY

A workflow management system for managing workflow within one or more entities is provided. The workflow management system may include a first drop-box application program executed on a first computing system having a first input object directory configured to receive an input object electronically outputted from an application program. The first drop-box application program may further include a first workflow engine configured to generate and send a workflow package to a second drop-box application program executed on a second computing system, the workflow package including the input object, a plurality of workflow tasks, and a set of predetermined workflow rules defined by a user via the first drop-box application program. In some examples, at least one workflow task may be implemented via the second drop-box application program based on the set workflow rules.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE FIGURES

FIGS. 2A and 2B illustrate a flow diagram for managing workflow within the workflow management system of FIG. 1.

FIGS. 4A and 4B illustrate a flow diagram for managing billing and payment within the workflow management system of FIG. 1.

DETAILED DESCRIPTION

A workflow management system for managing workflow between two or more computing devices is discussed herein. The workflow system may be used to manage workflow within a single entity (e.g. organization, corporation, business, etc.) or between two or more entities. Furthermore, the workflow system may be applied to a number of different business fields including, but not limited to dentistry, medicine, academia, transportation, government, financial services, travel, commerce, corporate enterprises, law firms, etc. The workflow management system may include a first drop-box application program executed on a first computing system including a first input object directory configured to receive an input object electronically outputted from an application program. The first drop-box application program may further include a first workflow engine configured to generate and send a workflow package to a second drop-box application program executed on a second computing system, the workflow package including the input object, a plurality of workflow tasks, and a set of predetermined workflow rules defined by a user via the first drop-box application program. In some examples at least one workflow task may be implemented via the second drop-box application program based on the set workflow rules. In this way, workflow tasks may be efficiently carried out in a business entity via the workflow management system without superfluous user interaction. As a result the workflow expenditures within the business entity may be reduced.

Figure 1:
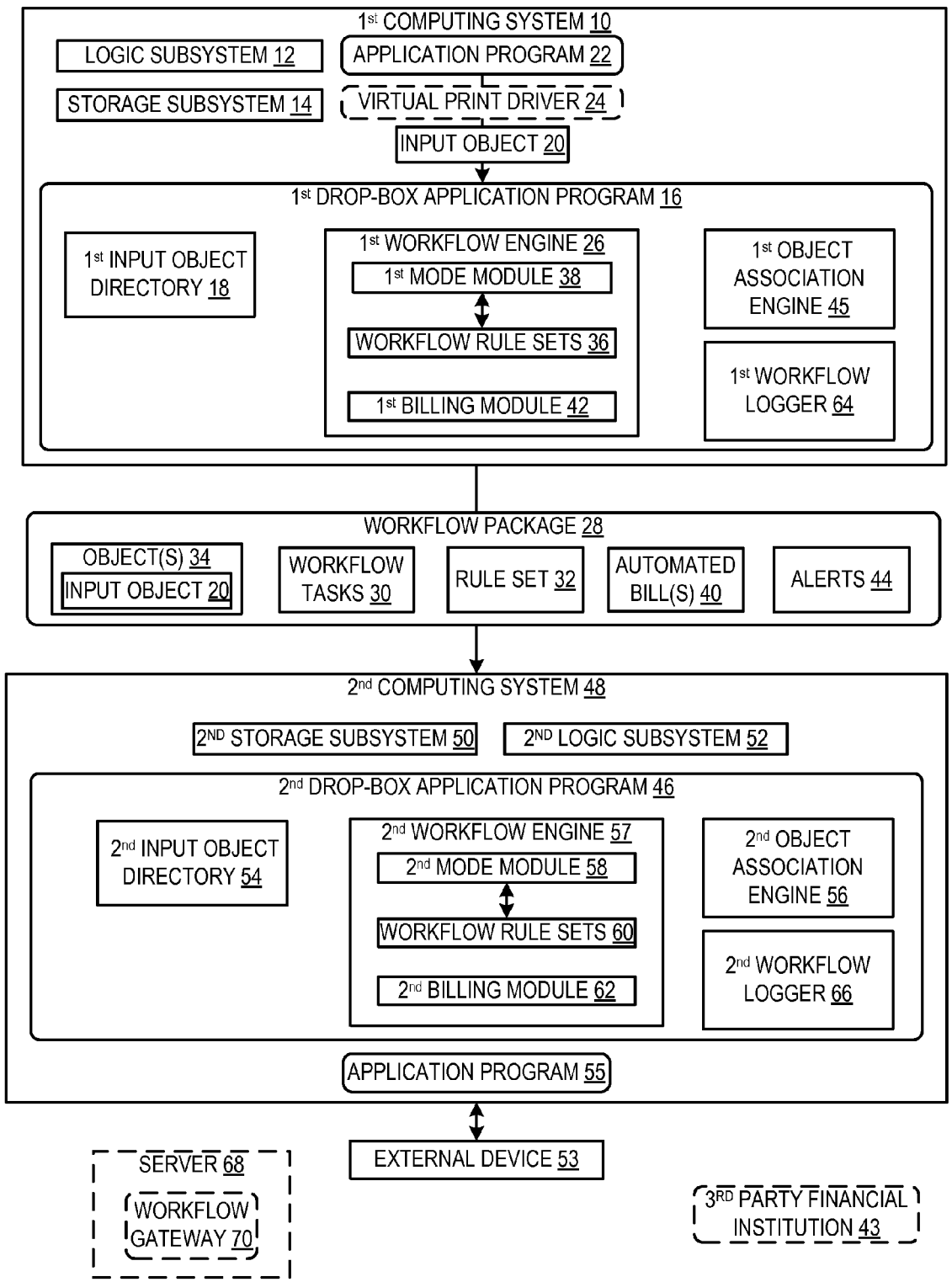
FIG. 1 shows an exemplary workflow management system according to one embodiment of the present invention.

FIG. 1 shows a workflow management system 1 for managing workflow within one or more entities. It will be appreciated that the workflow management system 1 is applicable to a variety of businesses, including but not limited to dental offices, medical offices, law firms, manufacturing companies, etc. The workflow management system 1 may include a first computing system 10, which may include one or more computing devices connected via a suitable communications network.

The first computing system 10 may include a logic subsystem (e.g., processor) 12 and a storage subsystem (e.g., memory) 14 including instructions executable by the logic subsystem 12. The logic subsystem 12 and storage subsystem 14 may be included on one computing device, or on a plurality of computing devices connected by communications networks and configured for distributed computing. Exemplary computing devices of the first computing system 10 may include: personal computers, mobile devices, lab workstations, document scanners, image scanners, 3D optical scanners, 3D CT scanners, rapid-prototyping machines, CAD/CAM machines, kiosks, digital signage systems, solid-state devices, TVs, cameras, digital video recorders, digital audio recorders, MP3 players, wireless devices, USB key fob, gaming consoles, barcode scanners.

The first computing system 10 may further include a first drop-box application program 16 executable via logic subsystem 12 and stored on storage subsystem 14. In some embodiments the first drop-box application program 16 may be a stand-alone, executable application. In other embodiments the first drop-box application program may be embedded in third party software as a plug in or add on. Further still in other embodiments the first drop-box application program may be a web application executed by the first computing system by accessing an application server via a network such as the Internet. Among other things, the first drop-box application program may be configured to send and receive workflow packages as well as execute various tasks, as discussed in greater detail herein.

The first drop-box application program 16 may include a first input object directory 18. The first input object directory may be configured to receive an input object 20 electronically outputted from an application program 22, such as a word processing application, a vector graphics application, etc. The input object 20 (e.g., a file) may be in a suitable format such as a Windows Metafile (WMF), Enhanced Metafile (EMF), Tagged Image File Format (TIFF), Joint Photographic Experts Group (JPEG), Bit Map file format (BMP), Portable Network Graphics (PNG), and text (TXT).

In some examples, the input object 20 may be electronically outputted by the application program 22 by a virtual printing process. For example, the first drop-box application program 16 may be configured as a virtual printer displayed as a target drop-box option in a printer selection menu during a print operation of the application program 22, the target drop-box option being configured to enable a user to command the application program to send a print job included in the print operation to the first input object directory 18. In this way, a user may be able to send an object to the first drop-box application program from an application program, such as application program 22, in a convenient manner, thereby simplifying the process of transferring an object to the first drop-box application program when compared to other workflow systems that may require a user to change file formats before transferring a file to an application program. It will be appreciated that the first drop-box program is configured to interact with software developed by third parties and thus the application program 22 may be a third party application program. In this manner, the developer community may develop a large number of application programs specifically suited for different fields of use and modes of operation. Further, in some cases, an application program 22 may be co-developed by the same developer who created the drop-box application program.

It will be appreciated that a driver such as a virtual print driver (VPD) 24 may be utilized by the first computing system 10 to enable electronic outputting by virtually printing from the application program, in some examples. However, in other examples other suitable software may be used to enable electronic outputting from the application program. Additionally, the VPD may determine what application program is printing in order to associate file types and file structures with that specific application in order to extract metadata from the printed object.

It can be appreciated that additional or alternative functions may be used to transfer objects to the first input object directory 18. For example, a file may be "dropped' into the first input object directory via a drag and drop feature in a user interface (UI), presented via the first computing system 10. Furthermore, objects may be automatically sent to the first input object directory from various electronic devices. For example, a barcode scanner may be coupled to the first computing system. The data collected from the barcode scanner may be automatically transferred to the first input object directory when an object is scanned. In another example, an image scanner may be coupled to the first computing system. The objects (e.g., image files) generated by the image scanner may be automatically transferred to the first input object directory when an item is scanned.

Files that are transferred to the first input object directory 18 may be parsed and have text and images extracted to a searchable format. Preset query structures may be provided with the first drop-box application program. A user may complete the preset query fields to trigger local or remote execution of the query. The preset query structure may produce more accurate and consistent results across different drop-box application program users.

In some embodiments, the first drop-box application program may be configured to assign a local folder as the first input object directory 18. The first input object directory may be exposed to other drop-box application programs such as the second drop-box application program. In other words, additional drop-box application programs may access and in some cases add, edit or delete objects within the first input object directory. It will be appreciated that a user may select a level of security for the first input object directory. For example, a user may be prompted to enter personal identification number (PIN) to access the first input object directory. Additionally, the user may authorize or deny requests to access the first input object directory. In some examples, at least a portion of the drop-box application programs granted access to the first input object directory may then monitor the directory for changes, deletions, and additions as well as synchronize changes between at least a portion of the associated input object directories included in the additional drop-box application programs. In this way, objects in multiple drop-box application programs may be synchronized.

Furthermore the first drop-box application program 16 may be configured to monitor a database, which may be associated with the application program 22. The drop-box application program may further be configured to send and receive database replication and/or synchronization instructions. In other words, the first drop-box application program may be configured to copy and/or update the database. For example, the table/view records corresponding to the monitored database may have one or more fields that are used to define the replication state of the files included in the monitored database. The aforementioned fields may include but are not limited to an active field, a delete field, a field displaying the last date and time of modification, and a field displaying the date and time of file creation. Additionally the table/view records corresponding to the monitored database may support a Globally or Universally Unique Identifier field used to determine if a file already exists in a replicated or synchronized database. The first drop-box application program 16 may also be configured to monitor changes in a specific table/view record. Additionally, another drop-box application program may be assigned to listen on or poll a specific Internet Protocol Suite (TCP/IP) port and protocol to support an application program interface of the first drop-box application program and allow third party software solutions access to the secure and fault-tolerant networking features of the workflow management system.

The first drop-box application program 16 may further include a first workflow engine 26. The first workflow engine may be configured to generate a workflow package 28. Workflow package 28 may include input object 20 electronically outputted from the application program 22, a plurality of workflow tasks 30, and a set of predetermined workflow rules 32. In some examples, the workflow tasks may include code executable by a logic subsystem to perform one or more of the following actions: implement one or more functions in an application program, initiate an action in an external device, and modify one or more objects stored within the workflow management system. In other examples, the workflow tasks may include additional or alternatively suitable actions executable by a logic subsystem, discussed in greater detail herein.

In the depicted embodiment, input object 20 is included as one object in a set of a plurality of objects 34 in the workflow package 28. However, in other embodiments only one input object 20 may be included in workflow package 28. Furthermore, the set of predetermined workflow rules 32 in the workflow package 28 may be selected from a plurality of predetermined sets of workflow rules 36 by a mode module 38 included in the first workflow engine 26 based on user input. In some examples, each set of workflow rules included in the first workflow engine may correspond to a group of users within a business entity. Therefore, a user may quickly alter the set of active workflow rules to suit the user's particular workflow needs.

Furthermore, the first mode module 38 may be configured to switch a user interface configuration to accommodate the work-flow requirements and parameters of a specific group of users, in some embodiments. For example, in the medical field the mode module may switch to a "patient" UI when a patient is utilizing the drop-box application program. The "patient" UI may be configured to present the patient's medical information and may inhibit the patient from editing patient's medical information. Likewise, the mode module may switch to a "doctor" UI when a physician is utilizing the drop-box application program. The "physician" UI may be configured to enable a physician to edit the patient's medical information, request additional procedures, and/or consult with other health practitioners (e.g., other physicians, pharmacists, nurses, etc.). Other exemplary UI's include a "banking" UI configured to enhance the presentation of electronic banking services. The accommodation of a multitude of UI's has numerous benefits to the workflow management system including, enhanced security, enhanced archival ability, and increased accountability. Moreover, the accommodation of a multitude of UI's may appeal to a wide range of businesses.

The predetermined workflow rule sets 36 may include at least one of the following rules; a date and time rule, a sequencing rule, a distribution rule, a form rule, a business rule, a monitoring rule, a permission rule, and an expiration rule. The sequencing rule may govern the sequence in which workflow tasks are carried out. For example, the sequencing rule may be configured to selectively trigger implementation of at least one workflow task after one or more sequencing criteria has been fulfilled. It will be appreciated that selectively triggering implementation of at least one workflow task may include triggering as well as temporarily inhibiting implementation of at least one workflow task. Exemplary sequencing criteria may include implementation or completion of a second workflow task, conclusion of a predetermined time interval, etc.

The distribution rule may be configured to transfer workflow packages to various recipients according to predetermined parameters. For example, a first workflow package including a first set of input objects (e.g., files) may be sent to a second drop-box application program from a first drop-box application program while a second workflow package including a second set of input objects may be sent to a third drop-box application program from the first drop-box application program. In some examples, a user of the first drop-box application program may manually complete a form to determine the distribution rules associated with a workflow package. However, in other examples the distribution rules associated with the workflow package may be predetermined.

The form rules may be configured to create a form and/or a portion of a form. Additionally, the form rules may prompt a user to complete the generated forms. Workflow management and scripting will be generated through a form, such as a custom-made health care order, described in U.S. patent application Ser. No. 12/604,336, titled "SYSTEMS AND METHODS FOR SPECIFYING AN ITEM ORDER", the entire disclosure of which is herein is incorporated by reference. In some cases the recipient (e.g., drop-box application program) of the form will be determined through form completion. For example, ordering a particular lab service with certain parameters may yield a particular recipient of the completed form. Form rules may also be used to determine what forms need to be completed and to insure that an order form is completed properly so that no parameters are left out.

The business rule may be configured to enable stops, checkpoints, verifications, approvals, or other conditions to be met. For example, a lab order involving multiple parties may order inspections at several stages of the workflow. The stops, checkpoints, verifications, and approvals may be managed using a UI associated with the drop-box application program.

The monitoring rules may be configured to prompt the capture and management of additional data or files from devices and folders. These devices include scanners, Universal Serial Bus (USB) memory sticks, barcode readers, electronic signature pads, cameras, biometric devices, wireless memory cards, etc. Therefore, the monitoring rules may include code executable to monitor and/or record digital information from the aforementioned devices.

The form rules may be configured to permit the modification of objects (e.g., files or form contents) by selected recipients while other recipients may be able to view the file or form content. The permission may be determined on a case-by-case basis or may be determined through the form rules.

Some tasks included in a workflow package may be time sensitive. Thus, the expiration rule may be configured to tag the time sensitive tasks with expiration dates. For example, if a task cannot be completed in a predetermined amount of time the task may be canceled. Users of a drop-box application program may be persistently reminded when they are overdue on a task. Further in some examples, expiration rule may be configured to cancel a task after the task is overdue.

The data extraction rule may be configured to determine what data is extracted from one or more files, such as names, demographics, diagnoses, etc. The extracted data may trigger various functions within the workflow package. For example, a physician may want to extract data such as a diagnosis from a PDF file, and if the PDF contains a life-threatening diagnosis various functions may be triggered within the workflow package. Therefore, the extracted data may be used to functionally modify workflow tasks.

The messaging rule may be configured to assign messaging tasks, such as sending memos, sending messages, sending alerts, and sending notifications, to a drop-box application program or other applications within the computing system. In some examples, the timing, content, recipient, and priority of these communications may be determined by the messaging rule. The aforementioned memos, messages, alerts, and notifications may be sent to a recipient's drop-box application program.

Another workflow rule which may be included in the workflow rule set 36 may be a multi-object handling rule. The multi-object handling rule may be configured to manage multiple objects within a workflow package. For example, in the event that more than one object is placed in a drop-box package, a workflow task may be assigned to multiple objects. In some examples, the workflow task may be assigned to an object based on the time and date of creation of the object.

In some examples, the rules included in workflow rule set 36 may be assigned a hierarchy. In other words, some rules may be given priority. For example, when a workflow package is sent to a drop-box application program the highest priority rules may first be implemented. Further in some embodiments, the rules may be divided into two categories: exclusive and parallel. For example, parallel rules may be implemented at concurrent or overlapping time intervals while exclusive rules may be inhibited from implementation at concurrent or overlapping time intervals. Therefore, multiple rules contained within a workflow package may be implemented according to the aforementioned categories. However in other embodiments the workflow rules may not be divided into categories.

Continuing with FIG. 1, the workflow package may further include one or more automated bill(s) 40. The automated bills may be generated by a billing module 42. Among other things the billing module may be configured to communicate with a third party financial institution 43 (e.g., a bank) to enable a financial transaction. A billing protocol by which automated bills 40 are exchanged is discussed in greater detail herein with regard to FIGS. 4A and 4B.

The workflow package may also include one or more alerts 44. The alerts may be configured to warn a user of the second computing system of imminent workflow tasks. For example, user input may be needed to carry out a workflow task. Therefore alerts may be issued at predetermined time intervals before the task is due to notify the user. However, in other embodiments the workflow package may not include alerts.

Additional data may be included in the workflow package. For example, the objects in the workflow package may be tagged with metadata including but not limited to purpose, subject, distribution, message, and priority metadata forming at least a portion of the work-flow package. The work-flow package may include two categories of metadata. The first category may be metadata that is attached to an object included in the work-flow package. The attached metadata may include headers, annotations, overlays, etc., that may be attached to a file. The second category of metadata may be workflow package metadata. The workflow package metadata may be part of the workflow package and may or may not be compatible with other software applications. Metadata proprietary to the workflow package may include order generator scripts defining work-flow logic, disclosed in co-pending U.S. patent application Ser. No. 12/604,336, entitled SYSTEMS AND METHODS FOR SPECIFYING AN ITEM ORDER, which was filed Oct. 22, 2009, which has been incorporated herein by reference.

The first drop-box application program 16 may also include a first object association engine 45. The first object association engine may be configured to determine the workflow objects included in the workflow package 28 as well as how an object is associated with workflow tasks included in the workflow package. Additionally, the first object association engine may be configured to manage staging of batch processes associated with the workflow package, selection of recipients of the workflow package, and authentication of recipients. Further still in some examples, the first object association engine may be configured to send objects to the workflow package in batches. Batched sending allows the first drop-box application program to complete the file transfer process at a later time. The first drop-box application program may hold an object in a group or batch to be sent later with common workflow tasks.

The workflow engine may further be configured to send workflow package 28 to the second drop-box application program 46 included in a second computing system 48. The second drop-box application program may be stored on a second storage subsystem (e.g., memory) 50 executable by a second logic subsystem (e.g. processor) 52. The second drop-box application program may include a second workflow engine 57 configured to implement at least one workflow task included in the workflow package 28. As previously discussed, the workflow task may include one or more of the following actions: implement one or more functions in an application program, initiate an action in an external device, and modify one or more objects stored within the workflow management system. In this way, workflow tasks may be automatically implemented without user interaction, thereby streamlining the workflow process. Further in some examples the workflow task may include executing a remote command in an external device 53. For example a driver, included in the workflow package, may be sent to the external device along with a script configured to execute a command in the external device. In some examples, the external device may be an instrument, such as a dental impression scanner.

The second drop-box application program may include a second input object directory 54 configured to store objects, such as the input object included in the workflow package as well as additional objects, such as objects printed from an application program 55. Like application program 22, application program 55 may be a third party application program, or may be co-developed by the developer of the second drop-box application program. A second object association engine 56 may also be included in the second drop-box application program. The second workflow engine 57 may include a second mode module 58, workflow rule sets 60, and a second billing module 62. It will be appreciated that the second workflow engine 57, the second mode module 58, and the second billing module 62 may have similar functionalities to the first workflow engine 26, the first mode module 38, and the first billing module 42, Additionally, the second drop-box application program may modify workflow package 28 or generate a second workflow package and send the workflow package to a third drop-box application program. It will be appreciated that the user of the first drop-box application may specify the second and third drop-box application programs as intended recipients of the workflow package. In this way, a multitude of workflow tasks may be carried out in a number of computing systems with a minimum amount of user interaction, increasing the system's efficiency.

As depicted the workflow management system may also include a first workflow logger 64 and a second workflow logger 66. The first and second workflow loggers may be configured to log all incoming and outgoing events and processes. In this example, the first drop-box application program 16 and the second drop-box application program 46 maintain their own independent logs. In this way, communication between two or more drop-box application programs can be verified. In some examples, independent logs regarding the same workflow package, generated by two or more drop-box application programs, can be synchronized to form a shared log. However, in other examples, alternate logging methods are possible, such as a method in which a single drop-box maintains logs for two or more drop-boxes. Thus, the first and second workflow loggers allow the workflow to be audited and iteratively improved.

In some examples, a server 68 may be used to enable communication between the first and second computing systems (e.g., the first and second drop-box application programs). In such an example the first and second drop-box application programs may be mutually authenticated, to facilitate secure data transmission. In some examples, authentication may be accomplished by using one of two common forms of identification such as a phone number, an email address, etc. Authentication may be initiated when the sender requests mutual authentication with the recipient.

Further, in some examples, authentication may be carried out in the following manner, although it will be appreciated that alternative authentication procedures are possible. Initially, a new user may enter the user's phone number or email into the first drop-box application program. In some examples, one number or email may be allowed per drop-box application program. The new user may receive an email confirmation or an immediate call back to the number provided. An ephemeral code (e.g. a one-time use code) may be provided for authentication. The code may authenticate the user's account with a secure Workflow Gateway 70. Other users wanting to establish a connection (e.g. network) with the aforementioned user need only to enter the new user's phone number or email. If the new user accepts the invitation, both users may send and receive data from one another.

If the sender and recipient have been mutually authenticated, in some embodiments, a user may input a Personal Identification Number (PIN) into the first drop-box application program to send a workflow package. The destination and functionality of the workflow package may be predetermined by the user via the first drop-box application program. After the user chooses to send the workflow package, the first drop-box application program then clones, chunks, and encrypts the entire workflow package in preparation for transmission.

Both the first and second drop-box application programs may "tickle" the server 68 on a periodic basis in order to send/receive messages, data/file chunks, and status changes. A "tickle" event may include a client/server Hypertext Transfer Protocol over Secure Socket Layer (HTTPS) data exchange. In some examples, if the first drop-box application program does not have any messages to send, the first drop-box application program may periodically "tickle" the server to inform the server that it is on-line and ask the server for any new messages/data.

The server may act as a broker between the first drop-box application program and the second drop-box application program. In this example, the workflow package may be sent to a server according to a dual encryption protocol in which encrypted "chunks" of data may be sent to the server. Therefore, the file package may not be assembled by the server, but merely passes through memory on its way to the recipient, increasing the security of the workflow system. In this way the data is temporarily stored in the memory of the server. Specifically, the encrypted chunks may pass through allocated memory on the server so that the workflow package may not be written or stored on the server's hard disk. Furthermore, the server may allocate a small amount of memory per client to be used for the passing of small chunks of data, to avoid holding an entire package, ensuring a small portion of a file or package is ever in the server's memory at one instance of time. If chunks may be not picked up by the second drop-box application program within a predetermined amount of time, those chunks may be purged from memory and the sender will have to resend those chunks the next time the recipient is on-line. In this way the security of the workflow package may be enhanced.

In some examples, a user may wish to send a workflow package from the first drop-box application program to a recipient that does not have the drop-box application program. Therefore, the user may enter the recipient's email address into the first drop-box application program. If the user enters an email address into the first drop-box application program a secure download link may be sent to the recipient's email address. The link contained within the email may prompt the workflow gateway 70 to begin downloading a drop-box application program from the sender. In this case the workflow package will not execute on the recipient's side until the recipient downloads and installs the drop-box application program.

In other examples, a peer-to-peer network may be used to enable communication between the first and second computing systems (e.g., the first and second drop-box application programs). A peer-to-peer network may be defined as a network in which two or more participants are configured to make available a portion of their computing resources (e.g. processing power, disk storage, network bandwidth, etc.) available to other network participants. This allocation of resources is implemented without central coordination from a server, host, etc. In other words participants in the network both supply and consume computing resources. The peer-to-peer network enables communication between the various entities in the workflow management system without a server, thereby increasing the adaptability of the workflow management system over a wider range of industries. Moreover, a peer-to-peer network may be less susceptible to system-wide network outages when compared to a system utilizing a centralized server based model.

Figure 2B:
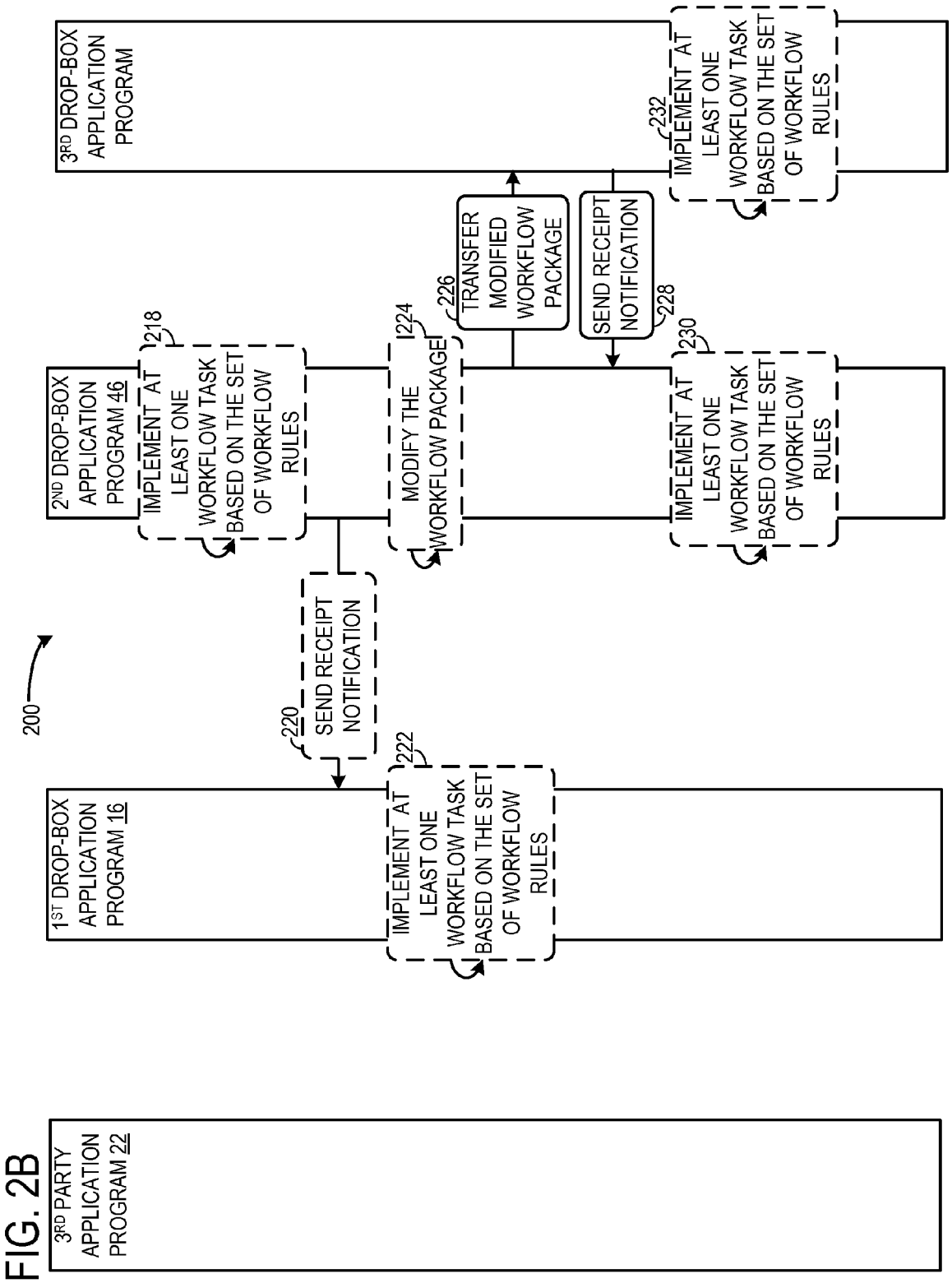

FIGS. 2A and 2B illustrate a method 200 for generation and management of a workflow package within a workflow management system. It will be appreciated that method 200 may be implemented using the hardware and software components of the workflow management system 10 described above, or by other suitable hardware components.

At 202 in FIG. 2A, the method may include generating an input object in application program 22. Next at 204 the method may include electronically outputting the input object from the application program to the first drop-box application program 16. At 206 the method includes storing the input object in the first input object directory 18 and at 208 establishing a plurality of workflow rule sets.

At 210 the method includes generating a workflow package via the first drop-box application program. As previously discussed the workflow package may include one or more input objects, a predetermined rule set, and a plurality of workflow tasks. In some examples, the predetermined rule set may be selected from the plurality of workflow rule sets by a mode module. In one exemplary scenario each rule set may correspond to a different business entity or a group of employees within a business entity. Therefore a user may quickly switch between workflow rule sets without having to manually edit the rules sets, increasing the user's efficiency.

At 212 the method may include implementing at least one workflow task based on the set of workflow rules via the first drop-box application program. At 214 the method includes transferring the workflow package from the first drop-box application program to the second drop-box application program. At 216 the method may include entering an alphanumeric code to access the workflow package. In this way, security within the workflow system may be enhanced. However, in other examples step 216 may not be included in method 200.

At 218 in FIG. 2B, the method may include implementing at least one workflow task based on the set of workflow rules via the second drop-box application program. It will be appreciated that in other embodiments the workflow task may be implemented via another suitable element within the second computing system.

At 220 the method may include sending a receipt notification of the workflow package from the second drop-box application program to the first drop-box application program. Next at 222 the method may include implementing at least one workflow task based on the set of workflow rules included in the workflow package.

Next at 224 method 200 may include modifying the workflow package. As previously discussed modifying the workflow package may include altering the set of workflow rules, incorporating additional input objects, adjusting the plurality of workflow tasks. Next at 226 the method includes transferring the modified workflow package to a third drop-box application program. Next at 228 the method includes sending a receipt notification of the workflow package from the third drop-box application program to the second application program.

Next at 230 the method includes implementing at least one workflow task based on the set of workflow rules via the second drop-box application program. Next at 232 the method includes implementing at least one workflow task based on the set of workflow rules via the third drop-box application program.

Figure 3:
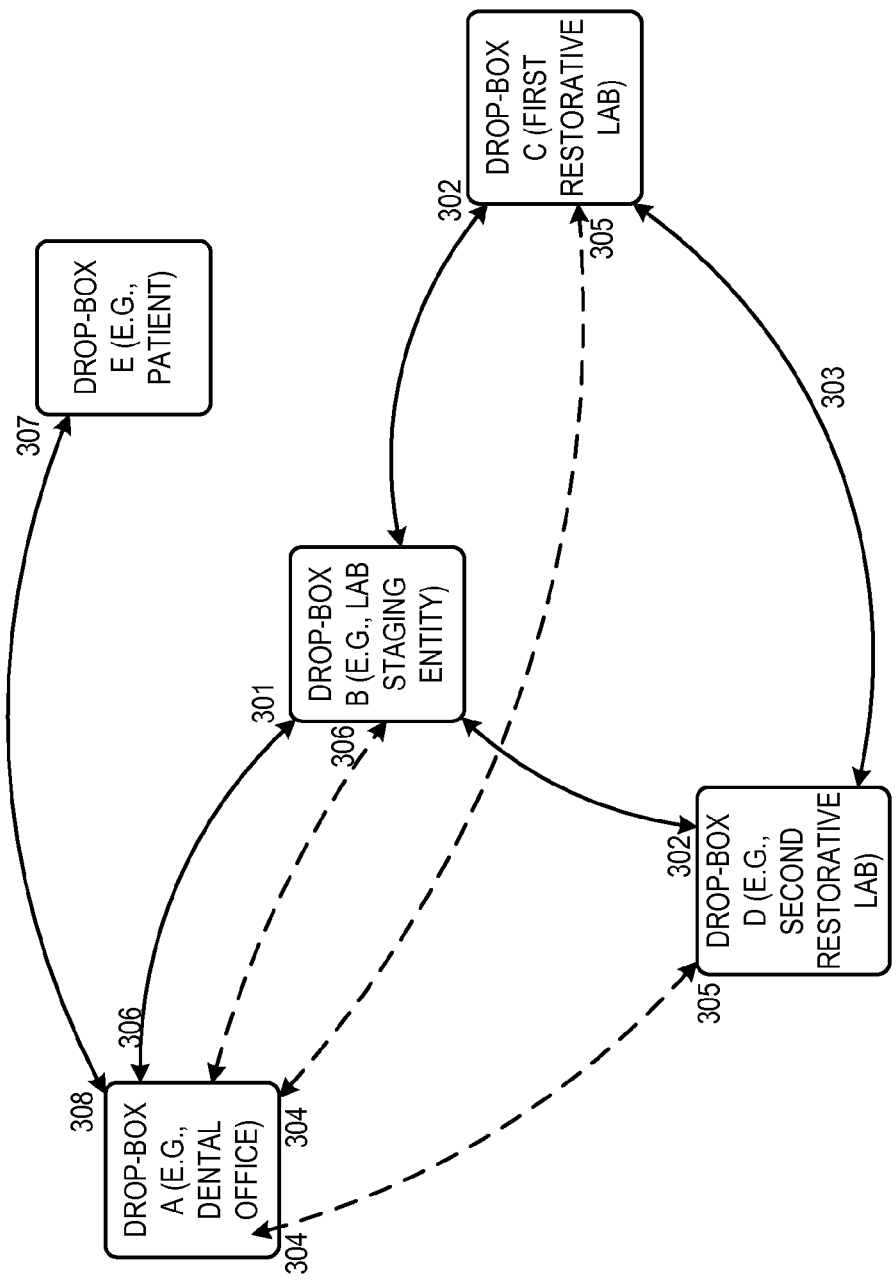
FIG. 3 illustrates an exemplary interaction between multiple drop-box application programs in the workflow management system of FIG. 1.

FIG. 3 shows an example of a multi-entity workflow management system where each entity has its own drop-box application program for sending, receiving, executing, and augmenting workflow packages, which may include workflow tasks as previously discussed. It can be appreciated that, other multi-entity workflow management systems are possible in other embodiments. First, a drop-box application program A associated with a dental office creates a workflow package for sending to drop-box application program B associated with a lab staging entity. The workflow package may include, for example, scans taken via a scanner in the dental office for producing a crown for a patient. Next, drop-box application program B receives at 301 the workflow package and executes a workflow task included in the workflow package created by drop-box application program A. In this example, drop-box application program B redirects and augments the workflow package for sending to drop-box application programs C and D, associated with first and second restorative labs, simultaneously. However, in other examples, the redirection and augmentation of the workflow package may be carried out during successive time intervals. Then drop-box application programs C and D receive their respective workflow packages at 302 from drop-box application program B and execute their respective workflow tasks.

In this example, the first restorative lab may be responsible for designing the crown based on scan data, and the second restorative lab may be responsible for milling the crown based on the crown design produced by the first restorative lab. Accordingly, drop-box application programs C and D are directed by the workflow tasks to communicate at 303 with each other regarding a workflow package which may be executed for their respective design and milling purposes, by each of the drop-box application programs C and D. Further, drop-box application programs C and D may be scripted to send workflow packages at 304, on behalf of, or via, drop-box application programs B, to drop-box application program A for review and approval. Thus, the completed designs from the first restorative lab, and images or scans of a prototype of the milled crown from the second restorative lab may be sent to the dental office via drop-box program A, via the drop-box program B of the lab staging entity. Thus, drop-box application program A may be unaware that drop-box application programs C and D are involved in the workflow. Drop-box application program A can be scripted to send approval at 305 to drop-box application programs B, C, and D simultaneously, which may be sent directly to each drop-box or via drop-box application program B. Then, drop-box application programs C and D notify drop-box application program B of the completion and shipment date. In turn, drop-box application program B notifies drop-box application program A of the shipment date, for example. Drop-box application programs C and D may collaborate to fulfill the order and ship product to drop-box application program B. For example, the first restorative lab may send designs for the crown to the second restorative lab, which are judged to require modification for manufacture according to the processes of the second restorative lab. The second restorative lab may communicate such proposed design modifications back to the first restorative lab via the drop-box application programs C and D, and receive confirmation from the first restorative lab that the modifications are acceptable according to the design standards of the first restorative lab.

After receiving the final product, drop-box application program B ships the final product to drop-box application program A and sends the workflow package to drop-box application program A for notification that the fulfilled order has shipped at 306. Drop-box application program A then sends workflow package to drop-box application program E for notification of the final delivery date. Drop-box application program A sends confirmation to drop-box application program B that the final product has arrived. Then drop-box application program A sends notification at 307 to a drop-box application program E associated with the patient, that the crown has arrived and also includes a proposed date and time for an appointment to fit the crown. The patient, via drop-box application program E, then sends confirmation at 308 of the date and time for the appointment with dental office associated with drop-box application program A.

As shown in FIG. 3, the workflow package may have a pre-defined pathway (e.g. series of recipients, organizations and/or groups of recipients) based on specified workflow tasks, which may be pre-determined, through which the workflow package travels. Each recipient may modify the workflow package based on the workflow tasks included in the workflow package. In this way a series of workflow tasks may be automated, thereby decreasing the amount of labor expended to perform the workflow tasks. As a result the efficiency within the business entity may be increased.

Figure 4A:
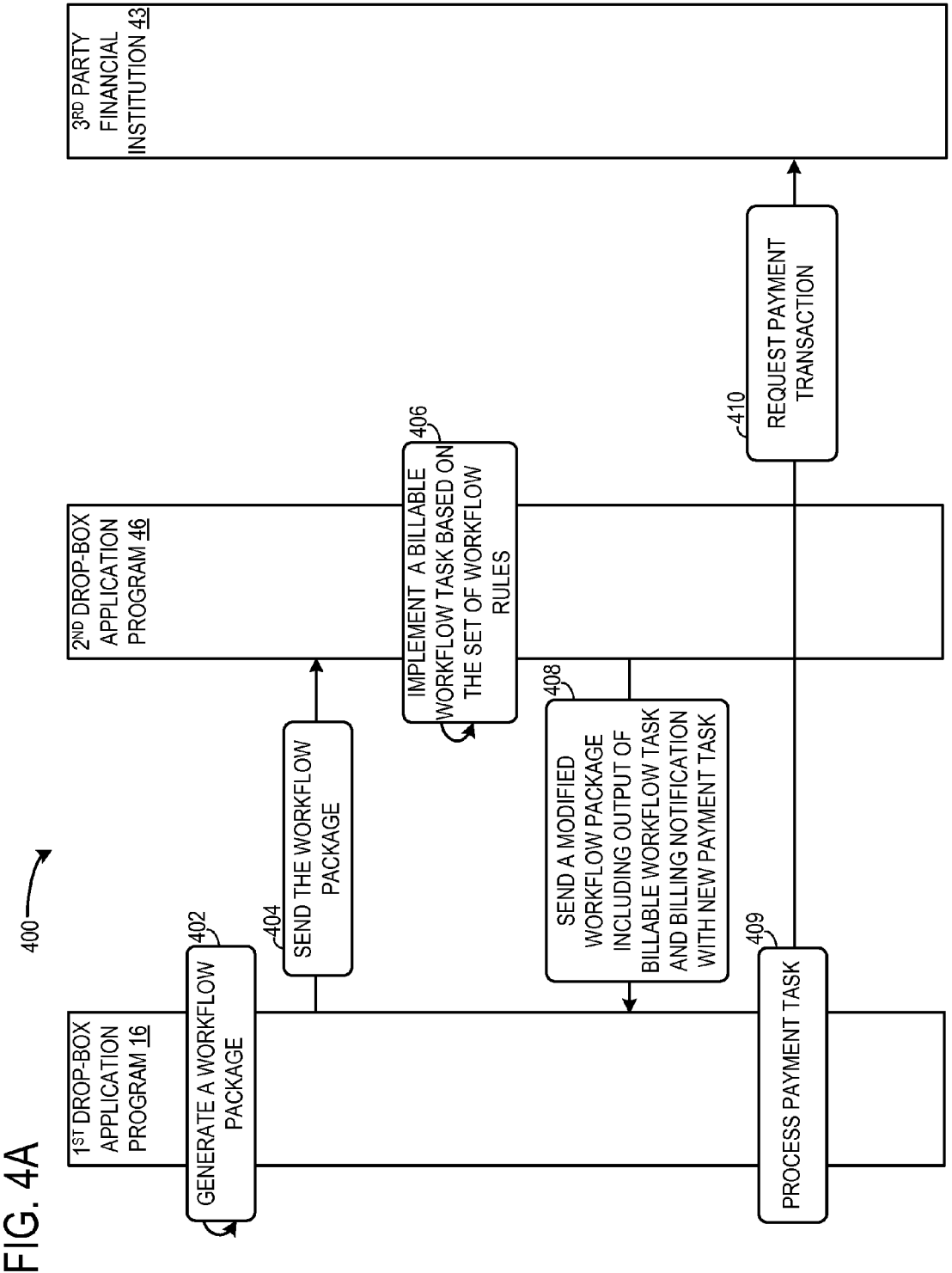

FIGS. 4A and 4B show a method 400 for managing payment and billing within a workflow management system. It will be appreciated that method 400 may be implemented using the hardware and software components of workflow management system described above, or by other suitable hardware components.

At 402 of FIG. 4A, the method includes generating a workflow package in the first drop-box application program. The workflow package may include a plurality of workflow tasks defined by a user and a set of predetermined workflow rules defined by the user. Next at 404 the method includes sending the workflow package from the first drop-box application program to the second drop-box application program. It will be appreciated that in some examples the workflow package may be sent over a peer-to-peer network. However in other examples the workflow package may be sent through a server, as described above. At 406 the method includes implementing a billable workflow task based on the set of workflow rules. As one example, the billable workflow task may be performing a scan of an object such as a dental impression.

Next, at 408, the method may include sending a modified workflow package including the output of the billable workflow task, such as the completed scan, and a billing notification, from the second drop-box application program to the first drop-box application program. Along with the billing notification, a process payment task may be included in the modified workflow package. According to the process payment task, an associated payment interface may be presented via the first drop-box application program, a plug-in application, or third party payment application, etc., and a user of the first drop-box application program may enter a payment method, such as debit card, credit card, bank account for electronic funds transfer (EFT) or wire transfer, online payment account such as a PAYPAL® account, pre-paid card, etc. At 409 the method includes processing, at the first drop-box application program, the payment task received with the billing notification. At 410 the method includes requesting implementation of a payment transaction at the third party financial institution via the first drop-box application program, by sending a request for payment transaction from the first drop-box application program to the third party financial institution. At 412 the method includes implementing the payment transaction at the third party financial institution. Implementing the financial transaction may include steps 414-418, described below. However it will be appreciated that in other examples additional or alternate steps may be used to implement the financial transaction. Further, it will be appreciated that mode modules 38, 58 may include a "payment transaction" mode in which the workflow rules and tasks involved in the process described above are defined, thereby making it easy for a user to engage in a payment transaction.

At 414 in FIG. 4B the method includes transferring funds from a source account associated with the first drop-box application program to an interim account. At 416 the method may further include generating revenue on the funds in the interim account over a predetermined time interval. It will be appreciated that the source account may be an account at the third party financial institution, or elsewhere, which is owned by an owner of the first drop-box application program, i.e., the payee for the billable workflow task in this example. The interim account, for example, may be an investment account that holds money market funds, etc., or a cash account such as a sweep account, which is designed to temporarily deploy the funds for a predetermined interval to other investment accounts to generate revenues. The predetermined interval, for example, may be an interval of overnight, one day, two days, or longer. In this way, revenue may be generated in the interim account, which may be shared with or distributed entirely to an owner of the first and/or second drop-box application programs and/or the proprietor of the workflow management system.

At 418 the method may include, after the predetermined time interval has elapsed, transferring the funds (in the amount originally paid from the source account) from the interim account to a target account associated with the second drop-box application program. The target account may be an account at the third party financial institution or elsewhere, and transfer of the funds may be implemented by EFT, wire transfer, check, debit, or other suitable transfer mechanism. At 420 a confirmation of the payment transaction may be sent from the third party financial institution to the payer via the first drop-box application program, and at 422 a notification of the payment transaction may be sent to the payee via the second drop-box application program. In some embodiments, a portion of the revenues generated at 416 may be distributed to the accounts of the payer and payee, and the confirmation at 420 and/or notification at 422 may include a statement of the revenues shared with each party. In other embodiments, a portion of the revenues generated may be transferred to an account owned by a proprietor of the workflow management system.

The method described above allows automated billing to be implemented within a workflow management system, thereby increasing the efficiency of the system. It offers the convenience to the payer and payee of a payment mechanism integrated with the billing notifications. Rules may be implemented to effect a payment timetable (e.g., 30 days), and give the payee notices of past-due accounts. Moreover, revenue may be generated over the predetermined interval using funds in the interim account, which may be shared with participants, or with a proprietor of the workflow management system.

Figure 5:
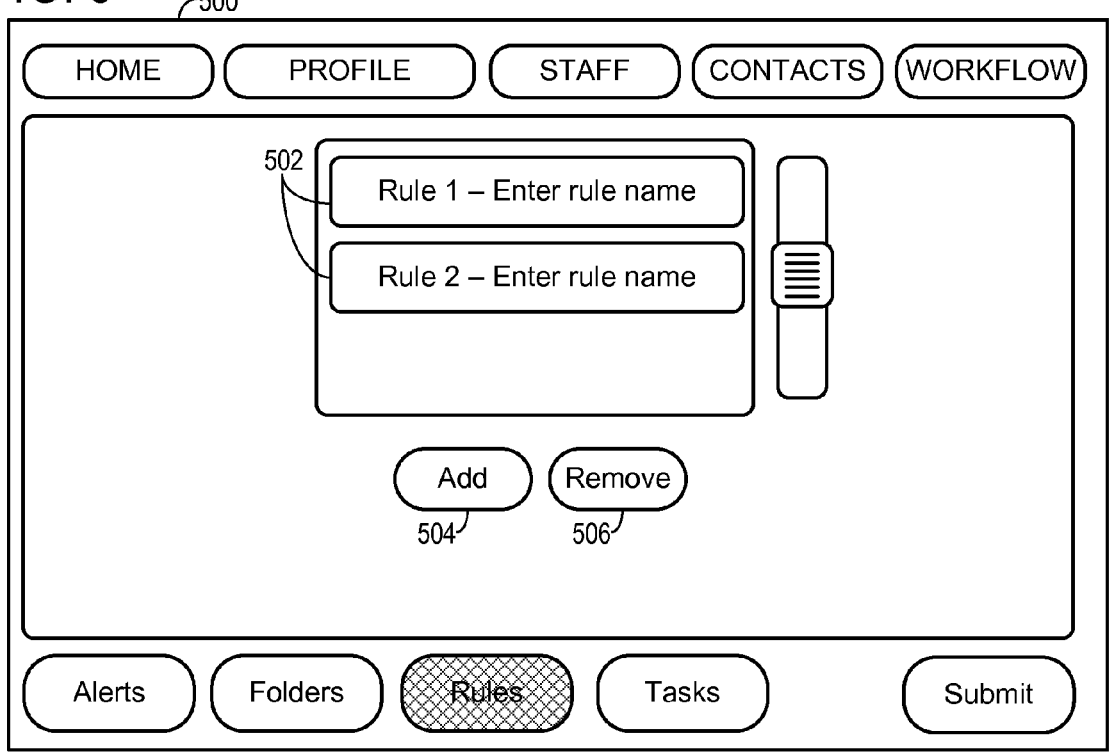
FIGS. 5-6 illustrate exemplary graphical user interfaces that may be used to manipulate various aspects of the workflow management system of FIG. 1.
Figure 6:
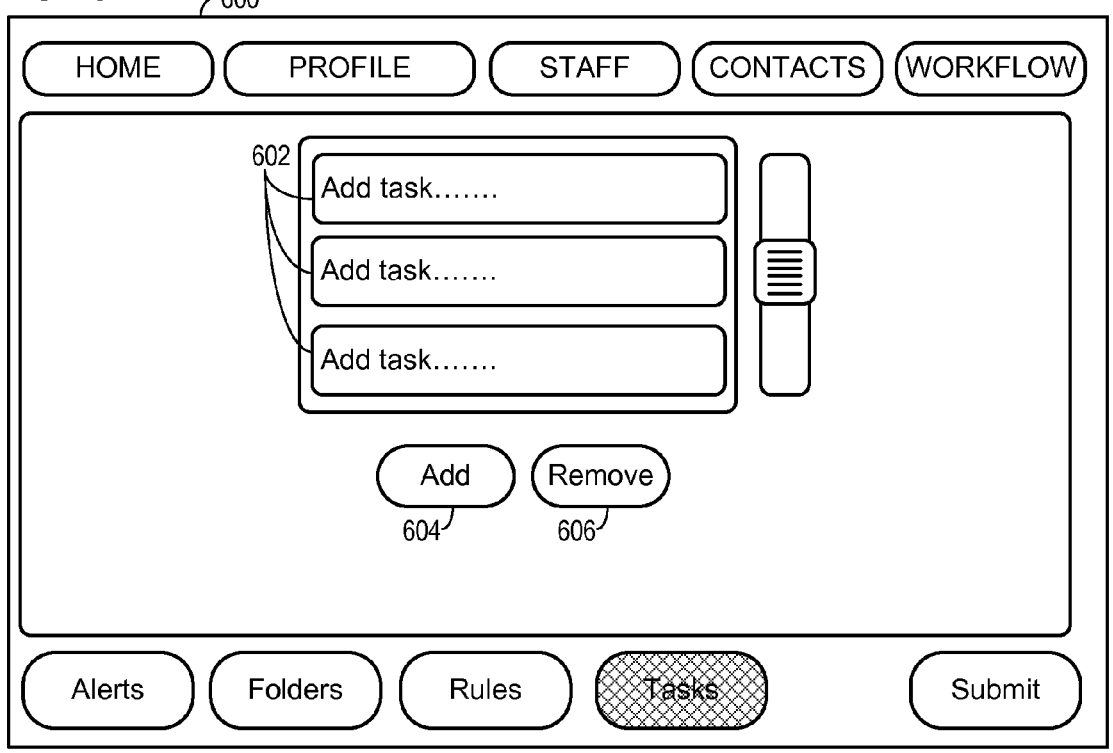

FIGS. 5-6 show various graphical user interfaces generated by a drop-box application program as described above, which may be used to add or remove a rule or a task in a workflow package. It will be appreciated that the graphical user interfaces shown in FIGS. 5-6 are exemplary in nature and other suitable graphical user interfaces may be utilized in other embodiments. FIG. 5 illustrates a graphical user interface (GUI) 500 that may be used to alter a workflow rule set. As shown a user may enter the name of the predetermined rule into text entry fields 502. It will be appreciated that each rule may include a corresponding script, as discussed above. The user may then select an "add" button 504 or a "remove" button 506 to add or remove the rule from a rule set included in the workflow package. In this way a user may customize one or more rule sets. Additional buttons are provided on the GUI to enable navigation within the drop-box application program.

FIG. 6 illustrates a GUI 600 that may be used to adjust the workflow tasks included in a workflow package. As shown a user may enter the name of the task into task entry fields 602. The user may then select an "add" button 604 or a "remove" button 606 to add or remove the task from a workflow package. In this way a user may customize the tasks included in the workflow package. It will be appreciated that a user may add or remove alerts to or from the workflow package in a similar manner.

Figure 7:
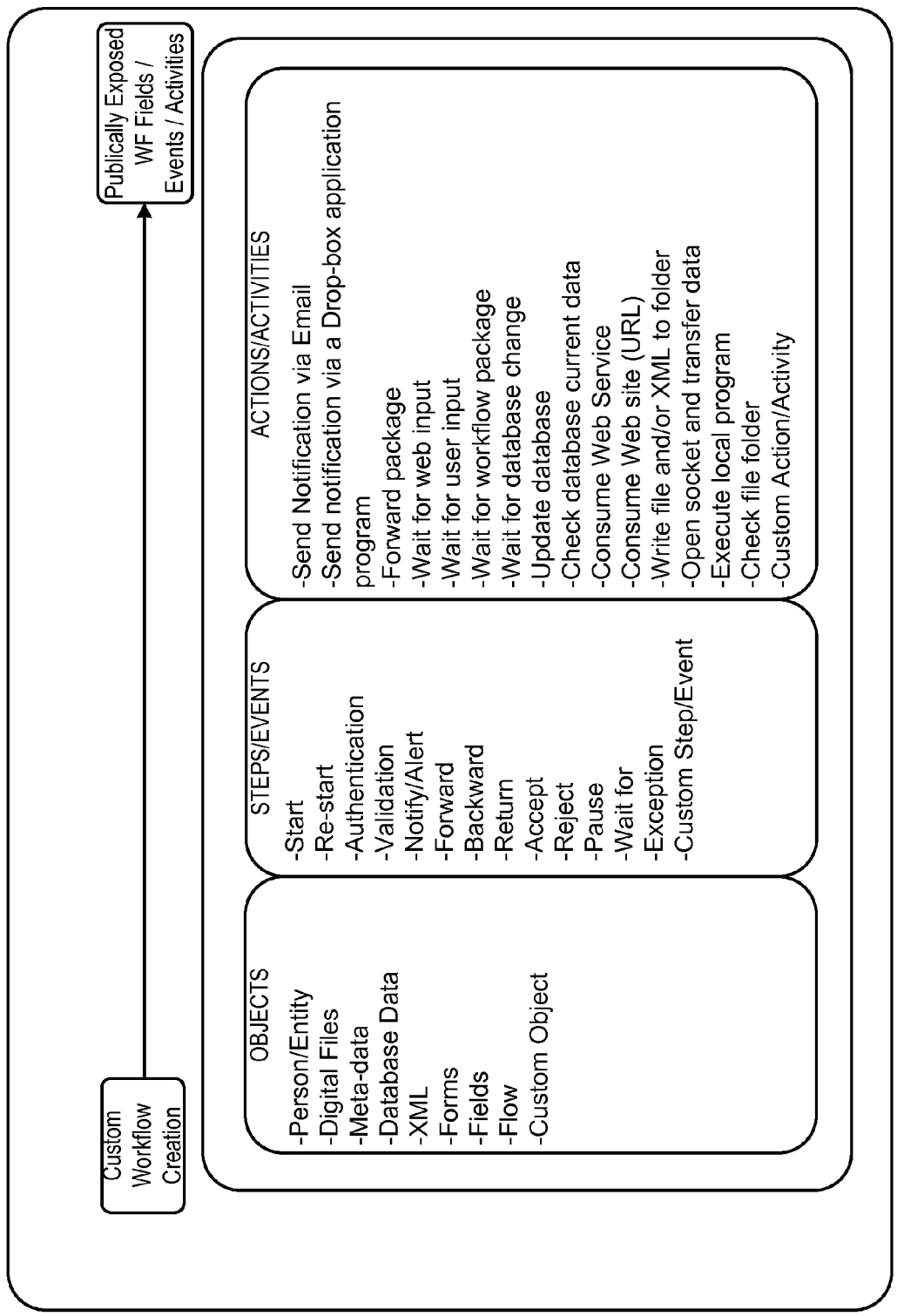
FIG. 7 shows an exemplary workflow designer that may be used to generate a workflow package in the workflow management system of FIG. 1.

FIG. 7 illustrates an exemplary workflow design diagram which may be used to generate a workflow package in a computing system. It will be appreciated that the workflow designer depicted in FIG. 7 is exemplary in nature and other suitable workflow designers may be utilized in other embodiments. Various objects may be included in the workflow package, such as person/entity, digital files, meta-data, database data, XML data, forms, rules, files, flow, and customized object, determined by a user. In some examples, the objects may be selected by the user. Furthermore, various steps/events as well as actions/activities may be included in the workflow package. The steps/events and the actions and activities may correspond to various workflow tasks such as start, re-start, authenticate, validate, notify/alert, forward, backward, return, accept, reject, pause, wait for, exception, and a custom step/event. The steps/events may determine the destination of a workflow package as well as how the workflow package may be modified.

Exemplary workflow actions/activities may include sending a notification via email, sending a notification via a drop-box program, forwarding a package, waiting for a web input, waiting for a user input, waiting for workflow package, waiting for a database change, updating a database, checking a database's current data, consuming a web service, consuming a web site (e.g. Uniform Resource Locator (URL)), writing a file and/or an Extensible Markup Language (XML) to a folder, opening a socket and transferring data, executing a local program, checking a file folder, and customization of an action/activity. The aforementioned customization of objects, steps/events, and/or actions/activities may be performed by a user via a computing device.

Figure 8:
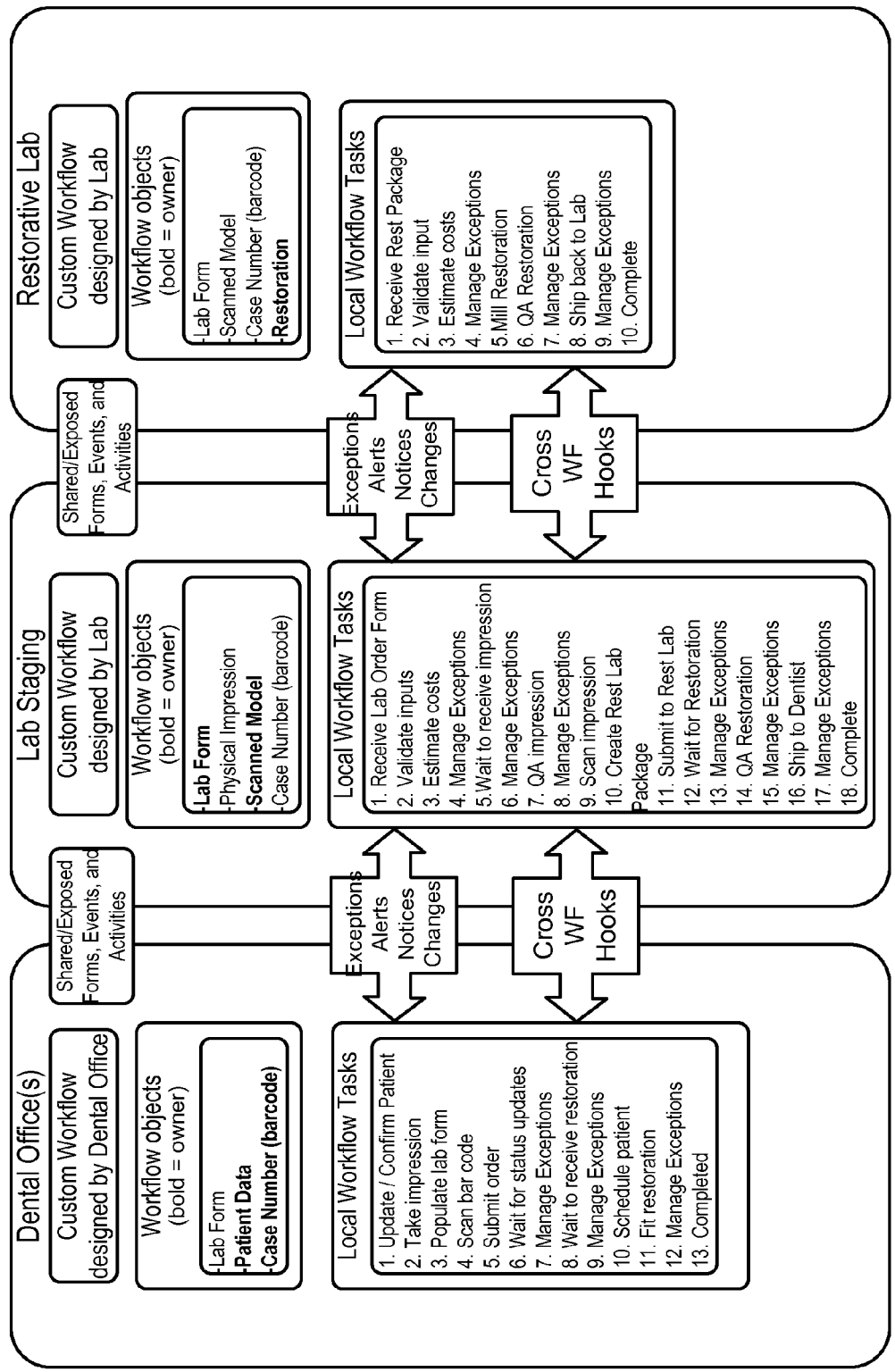
FIG. 8 illustrates a use case scenario of the workflow management system of FIG. 1, in the field of dentistry.

FIG. 8 illustrates an exemplary workflow system use case scenario which may be used in dentistry to quickly and effectively manage workflow. It will be appreciated that countless other workflow systems are possible, which may have wide ranging applications to other business, industries, etc., outside of the dental field. As previously discussed the businesses may include medical organizations, legal organizations, transportation organizations, etc.

In particular FIG. 8 shows a dental office, a lab staging office, and a restorative lab in communication. To facilitate communication between the dental office, the lab staging office, and the restorative lab, a peer-to-peer network or other suitable communications system may be utilized. The dental office may generate a custom workflow package. The workflow package may include various workflow objects, such as lab forms, patient data, case numbers (which may be represented as barcodes), rules, alerts, and exceptions. As previously mentioned the workflow objects may include various workflow files, workflow metadata, and workflow scripts. In the illustrated example, the objects in bold in the dental office box are be determined by the detail office.

The dental office may execute a number of local workflow tasks, which may be initiated by the workflow package. The local workflow tasks may include the following tasks in this approximate order: updating/confirming a patient's data, taking impressions, populating a lab form, scanning a barcode, submitting an order, waiting for status updates, managing exceptions, waiting to retrieve restoration, managing exceptions, scheduling patient visits, fitting restoration, managing exceptions, and a completed task. In this example, the tasks may be carried out in consecutive order, as listed in FIG. 8. However, in other examples, the tasks may be carried out non-consecutively. It will be appreciated that the aforementioned local workflow tasks are exemplary in nature and additional or alternative workflow tasks may be included in other examples.

Continuing with FIG. 8, the lab staging entity may also generate a custom workflow package. The lab staging entity-generated workflow package may include various workflow objects such as a lab form, physical impressions, scanned model, case number, etc., which may be in the form of a barcode, and exceptions. In the illustrated example, the objects in bold in the lab staging box may be determined by the lab staging entity.

The lab staging entity may carry out various local workflow tasks. The local workflow tasks may include the following tasks, in this approximate order: receiving a lab order form, validating input estimate costs, managing exceptions, waiting to receive impressions, managing exceptions, quality analysis of impressions, managing exceptions, scanning impressions, creating restorative lab package, submitting to restorative lab, waiting for restoration, managing exceptions, quality analysis of restoration, managing exceptions, shipping to dentist, managing exceptions, and completing workflow. In this example, the tasks may be carried out in consecutive order as listed in FIG. 8. However, in other examples, the tasks may be carried out non-consecutively, or in another order. It will be appreciated that the aforementioned local workflow tasks are exemplary in nature and additional or alternative workflow tasks may be included in other examples.

Continuing with FIG. 8, the restorative lab may generate a custom workflow package. The restorative lab-generated workflow package may include various workflow objects, such as a lab form, scanned model, case number (e.g. barcode), restoration, rules, alerts, and exceptions. As previously mentioned, the workflow scripts may be divided into workflow objects. The workflow objects in bold may be determined by the lab staging entity.

Additionally, the restorative lab may carry out various local workflow tasks. The local workflow tasks may include the following tasks, in this approximate order: receiving a restoration package, validating input, estimating costs, managing exceptions, milling restorations, performing quality assurance restorations, managing exceptions, shipping back to lab, managing exceptions, and completing the restorations. In this example, the tasks may be carried out consecutively, in the order listed in FIG. 8. However, in other examples, the tasks may be carried out non-consecutively. It will be appreciated that the aforementioned local workflow tasks are exemplary in nature and additional or alternative workflow tasks may be included in other examples. The workflow tasks for each entity (e.g., the dental office, lab staging entity, and restorative lab) may be dynamically modified or updated via cross workflow hooks and well as exceptions, alerts, notices, and changes. These cross workflow hooks may transfer data used between the dental office, the lab staging entity, and the restorative lab, using the techniques discussed above and illustrated in FIGS. 2A and 2B, and may exchange billing notifications and implement a payment transaction as shown in FIGS. 4A and 4B.

The following examples illustrate additional use-case scenarios that utilize the various systems and methods described herein.

In one example, a doctor (doctor A) may choose to search for information in an account or multiple accounts by selecting one or more peer accounts within his drop-box application program to be searched. A search function may then be performed, beginning in the local drop-box application program. Doctor A may input a search query, which may be in the form of keyword(s) and phrases, Boolean operators, and other parameters such as time frame, completion status, and priority. The drop-box query may then produce local results. If doctor A wants more information, the doctor may remote query to other users' drop-box application programs. The drop-box application program may then create a query file (XML) and securely send it to each remote drop-box application program that is selected. When the remote drop-box application programs receives the query, if permission is already allowed then the query may be executed, if permission is not already available then a request may be made. If permission is granted then the search may be executed and an XML file is sent back to doctor A. Once doctor A has the result, then a request to have an item sent, such as a lab report, may be made by Doctor A's drop-box application program.

Example 2

A physician may send a bacterial culture to a lab for processing. The lab may return the culture result to the sending physician. The physician may then want to query drop-box application programs from multiple peers to do an epidemiologic study. In so doing, the physician can investigate how widespread a certain illness is across a population or region. This information could possibly be used to track the spread of a contagious disease. The query results may be sorted by date to show the spread of the disease through a population. It will be understood that useful data could come from multiple labs and multiple drop-box application programs to yield relevant query results. It will also be appreciated that personal identifying information would not be part of the query results.

Example 3

A physician may do a work-up on a new patient that will require a complete blood count (CBC) test. To determine whether another physician performed a CBC test recently, the physician could use the drop-box application program to query to see if such lab work was previously completed. This may prevent the unnecessary duplication of a blood test, reducing time and cost.

Example 4

An orthodontist and a general dentist seeing the same patient may both order x-rays for the same patient around the same point in time. A drop-box application program query by either practitioner would reveal whether or not the same x-rays were already ordered by the other, and facilitate communication between the two practitioners to ensure that the minimum required set of x-rays is ordered. Such a use of the drop-box application program may reduce costs, time, and x-ray exposure for the patient.

Example 5

When a physician refers a patient to another doctor such as a specialist, the referring physician may wish to ensure that the referred patient follows through with the referral. The drop-box application program workflow management feature may provide confirmation that the specialist received the referral and another confirmation when the patient sees the specialist. Similarly, when a physician writes a prescription, confirmation that the prescription was filled by the patient may be provided by the pharmacy using the drop-box application program.

Example 6

A food poisoning outbreak is another example where multiple drop-box queries could yield useful results. With a food poisoning outbreak, it may be beneficial for government authorities to contain the outbreak by first identifying the source of the contaminated food supply. Useful information may be obtained from drop-box application program queries from a plurality of document types including, but not limited to, prescriptions, patient visit summaries, insurance documentation, letters to referring doctors, lab forms, lab reports, etc. It should be noted that all of these queries may be performed without personal identifying information. When dropping or printing to drop-box application program, text may be parsed and extracted that does not contain personally identifiable information, but which does provide information related to the outbreak, in order to provide the authorities with relevant information in an anonymous manner.

Example 7

Prevalence of certain conditions or diagnoses can be studied with a drop-box application program query. In orthodontics, bite classifications or categories can be studied for prevalence in a population and correlated with treatment modalities.

Example 8

As another application of the above described embodiments, electronic health information exchanges have been proposed and implemented in recent years, according to which health care providers and patients may communicate electronically about patient records, billing, benefits, prescriptions, provider recommendations, etc. It will be appreciated that the workflow management systems and methods described herein enable interaction between health care providers, insurers, and patients while offering benefits not found in these current health information exchanges. Such benefits include lack of a central repository at which patient data is stored outside the health care provider's computer systems, further protecting data privacy. Further, the workflow management systems and methods described herein can be used with existing enterprise software applications that are in use at various health care providers, insurers, etc., while enabling cross-platform implementation of workflow rules and tasks.

Example 9

As an example use case for scanning an impression for creation of a new digital study model, the following steps may be performed using the above described systems and methods. First, a dentist in a dental office scans an impression and sends the scan to a lab via a drop-box program, or physically sends the impression to the lab. According to workflow rules of the lab, the lab makes a digital study model, and sends a message from its drop-box application to the dental office's drop-box application, indicating that the digital study model is ready to be viewed. In this manner, it will be appreciated that the dental office and lab have a trusted relationship for exchange of workflow information through their respective drop-box application programs.

Example 10

As an example use case for a remote query through a drop-box by a dentist for an existing study model, the following steps may performed. First, the dentist may choose the lab, choose a purpose (e.g. search for study model), enter data into an xml search form (such as patient name, patient DOB), then select SEND. The search query from the dental office's drop-box to a recipient drop-box. The recipient drop-box uses query to authenticate the dental office drop-box as a trusted customer, locate a digital study model(s) by matching data entered in the XML form (patient name, patient DOB) with existing records, and then sending the matched digital study model(s) to the dentist's drop-box. If a matching study model does not exist, a message to that effect may be sent. Otherwise, the study model is sent, and an associated viewer application launches the study model based on purpose and file type of the study model.

Example 11

As an example use case for a drop-box point of sale payment, the following steps may be performed. First, a first user, the sender, sends to a second, trusted, user the recipient, a request for a payment transaction by selecting a mode of operation via a mode module, such as propose=payment transaction. Second, recipient registers the recipient's EFT account with affiliated financial institution. Typically, only the person receiving payment has to register an account with the financial institution. Third, the sender of the payment then enters credit card data, for example. Fourth, the financial institution associates the recipient's EFT account with the recipient's drop-box account on the workflow management system. Fifth, the sender's funds are paid to the financial institution, and the institution holds the funds for a predetermined period of time, such as 2 days, to generate interest income. Optionally, the sender or recipient may request immediate availability of the funds, for a fee. Typically a PIN is required to be entered to send and receive payments, and an administrator of the workflow management system can define which registered users of the sender's drop-box may send or receive payments, as well as which contacts of the drop-box to which payments may be sent or from which payments may be received, for security reasons. Sixth, once the transaction is complete, the sender and recipient each are sent a receipt of the transaction via the workflow management system, for record keeping, proof-of-purchase, warranty fulfillment, etc.

Example 12

As another potential benefit of the workflow management systems and methods described above, it will be appreciated that a workflow may be implemented according to which a reminder message is sent to the drop-box of an online shopper who abandons a purchase from an online shopping cart. Such unfulfilled transactions represent lost sales opportunities for online vendors. By requesting that a shopper enter drop-box information into an e-commerce site at some point during the online shopping experience, the workflow management system can track whether shopping items are abandoned in the shopping cart of the user, and send a drop-box to drop-box reminder to the user inquiring as to whether the user might be interested in completing the shopping transaction. If so, the transaction may be completed within the workflow management system, using the payment methods described above. In this manner lost opportunities may be recovered, and commerce may be shifted away from websites and into the workflow management systems described herein.

As an additional advantage of the invention, it will be appreciated that the drop-box programs described herein are designed to interact with a variety of third party application programs, thereby enabling the developer community to generate a wide ranging menu of applications for different industries and purposes. To enable such interaction, driver software for the drop-box application program may be provided, which may be installed by the software applications to enable electronic output of input objects directly from the third party application programs to the drop-box programs. By making the drop-box application programs function as virtual printers, for example, third party application programs may easily access standard print menus, and virtually print output to the drop-box application programs. In this way, extensive reconfiguration of existing software of the senders and recipients can be avoided, saving time and money over purpose-built enterprise-ware solutions.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A workflow management system for managing workflow within one or more entities comprising:
a first drop-box application program executed on a first computing system including:
a first input object directory configured to receive an input object electronically outputted from an application program; and
a first workflow engine configured to generate and send a workflow package to a second drop-box application program executed on a second computing system, the workflow package including the input object, a plurality of workflow tasks, and a set of predetermined workflow rules defined by a user via the first drop-box application program;
wherein at least one workflow task is implemented via the second drop-box application program based on the set of workflow rules and the set of workflow rules are selected from a plurality of predetermined sets of workflow rules by a mode module included in the first workflow engine based on user input.

2. The workflow management system of claim 1, wherein the plurality of workflow tasks include code executable by a logic subsystem to perform one or more of the following actions: implement one or more functions in an application program, initiate an action in an external device, and modify one or more objects stored within the workflow management system.

3. The workflow management system of claim 1, wherein the second drop-box application program includes:
a second input object directory configured to receive and store one or more objects included in the workflow package; and
a second workflow engine configured to receive the workflow package and execute at least one workflow task included in the workflow package based on at least one workflow rule included in the set of workflow rules.

4. The workflow management system of claim 3, wherein the first input object directory is searchable by the second workflow engine.

5. The workflow management system of claim 1, wherein electronically outputted includes virtually printing and the first drop-box application program is configured as a virtual printer displayed as a target drop-box option in a printer selection menu during a print operation, the target drop-box option being configured to enable a user to command the application program to send a print job included in the print operation to the first input object directory.

6. The workflow management system of claim 1, wherein the first and second computing systems are configured to communicate over a peer-to-peer network in which both the first and second computing systems make available a portion of their computing resources to implement communication.

7. The workflow management system of claim 1, wherein the first and second computing systems are configured to communicate through a server.

8. The workflow management system of claim 1, wherein the set of workflow rules include at least one of the following rules: a date and time rule, a sequencing rule, a distribution rule, a form rule, a business rule, a monitoring rule, a permission rule, and an expiration rule.

9. The workflow management system of claim 8, wherein the at least one workflow task included in the workflow package is implemented based on the sequencing rule configured to selectively trigger implementation of the at least one workflow task after one or more sequencing criteria has been fulfilled.

10. The workflow management system of claim 1, wherein the input object is in at least one of the following file formats: an Enhanced Metafile format, Tagged Image File format, Joint Photographic Experts Group format, Bit Map file format, Portable Network Graphics format, and text format.

11. The workflow management system of claim 1, wherein implementing the workflow task includes executing a remote command in an external device.

12. The workflow management system of claim 11, wherein executing a remote command in an external device includes downloading a driver included in the workflow package.

13. A method for managing workflow within one or more entities comprising:
- electronically outputting an input object to a first drop-box application program included in a first computing system from an application program;
- selecting a set of workflow rules included in a workflow package from a plurality of sets of predetermined workflow rules based on user input;
- generating the workflow package in the first drop-box application program, the workflow package including the input object, a plurality of workflow tasks defined by a user, and the set of predetermined workflow rules defined by the user;
- transferring the workflow package to a second drop-box application program included in a second computing system from the first drop-box application program; and
- implementing at least one workflow task based on the set of workflow rules via the second computing system.

14. The method of claim 13, wherein implementing the workflow task includes modifying the workflow package.

15. The method of claim 14, wherein modifying the workflow package includes modifying the workflow task or generating an additional workflow task.

16. The method of claim 14, wherein modifying the workflow package includes altering the input object or generating a second input object.

17. The method of claim 13, further comprising sending the workflow package to a third drop-box application program.

18. A workflow management system for managing workflow within one or more entities comprising:
- a first drop-box application program executed on a first computing system including:
    - a first input object directory configured to receive an input object electronically outputted from an application program; and
    - a first workflow engine configured to generate and send a workflow package including the input object, a plurality workflow tasks defined by a user, and a set of workflow rules defined by the user, to a second drop-box application program executed on a second computing system, the second drop-box application program including:
        - a second input object directory configured to receive and store the input object included in the workflow package; and
        - a second workflow engine configured to receive the workflow package and execute at least one workflow task included in the workflow package based on the set of workflow rules;
- wherein the set of workflow rules are selected from a plurality of predetermined sets of workflow rules by a mode module based on user input.

19. The workflow management system of claim 18, wherein the workflow tasks include script executable by a logic subsystem to perform one or more of the following actions: implement one or more functions in an application program, initiate an action in an external device, and modify one or more objects stored within the workflow management system.

* * * * *